United States Patent [19]

Hirao et al.

[11] Patent Number: 4,621,292
[45] Date of Patent: Nov. 4, 1986

[54] AUTOMATIC FOCUSING DEVICE FOR A VIDEO CAMERA

[75] Inventors: Yoshiaki Hirao, Habikino; Ryuichiro Kuga, Katano; Yoshitomi Nagaoka, Neyagawa, all of Japan

[73] Assignee: Matsushita Electric Industrial Co., Ltd., Osaka, Japan

[21] Appl. No.: 661,326

[22] Filed: Oct. 16, 1984

[30] Foreign Application Priority Data

Oct. 19, 1983 [JP] Japan ............................. 58-195635
Oct. 19, 1983 [JP] Japan ............................. 58-195665
Oct. 20, 1983 [JP] Japan ............................. 58-196322

[51] Int. Cl.⁴ ............................................. G01J 1/20
[52] U.S. Cl. .................................... 358/227; 354/401
[58] Field of Search ........................ 358/227; 356/1; 250/201 AF; 354/401, 403

[56] References Cited

U.S. PATENT DOCUMENTS

| | | | |
|---|---|---|---|
| 2,999,436 | 9/1961 | Faulhaber | 358/227 |
| 3,652,784 | 3/1972 | Wupper | 358/227 |
| 4,304,487 | 12/1981 | Odone et al. | 356/1 |
| 4,441,810 | 4/1984 | Momose | 354/403 |
| 4,445,029 | 4/1984 | Nagaoka et al. | 356/1 |
| 4,494,848 | 1/1985 | Ogawa | 356/1 |
| 4,522,492 | 6/1985 | Masunaga | 356/1 |

*Primary Examiner*—Gene Z. Rubinson
*Assistant Examiner*—L. C. Schroeder
*Attorney, Agent, or Firm*—Wenderoth, Lind & Ponack

[57] ABSTRACT

An automatic focusing device for a video camera includes a projector for projecting an infrared ray used for measuring distances and a converging lens for focusing reflected infrared ray light from an object whose distance is to be measured. A light spot detector and a computer are provided for determining whether the video camera is in focus. A lens encoder is utilized to determine the position of a focusing lens and a lens driving unit moves the position of a photographic lens used for photographing the object forwardly or backwardly in dependence upon outputs from the lens encoder and computer so as to automatically focus the video camera in response to the infrared rays reflected from the object to be photographed.

6 Claims, 13 Drawing Figures

AUTOMATIC FOCUSING DEVICE FOR A VIDEO CAMERA

BACKGROUND OF THE INVENTION

1. Field of the Invention

This invention relates to an automatic focusing device for a video camera which accurately focuses an image of an object to be photographed on a predetermined position when the video camera is focused.

2. Description of the Prior Art

Various automatic focusing devices for cameras having hitherto been proposed and put into practical use in video cameras and still cameras.

Figure 1:
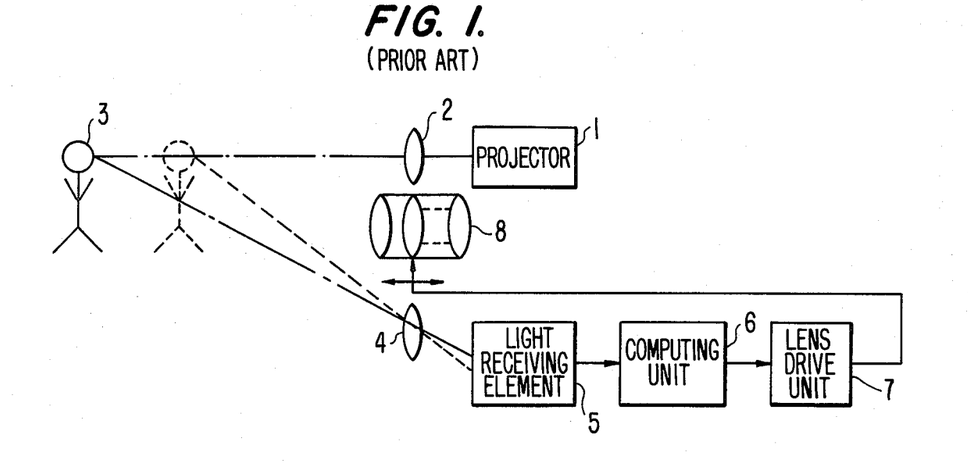
FIG. 1 is a schematic block diagram showing the principle of the active-focusing system.

One effective focusing device applicable to a video camera, projects a distance measuring signal, such as an infrared ray or an ultrasonic wave, to an object to be photographed (hereinafter called the object), and receives the distance measuring signal reflected from the object, and drives a camera lens toward the proper focusing position on the basis of the distance measuring signal (such a system will hereinafter be called an active focusing system). The principle of the active focusing system using an infrared ray is shown in FIG. 1, in which the infrared ray for measuring distance is projected from the projector 1, reaching an object 3 through a converging lens 2, and thereafter is reflected from the object 3 so as to be incident on a light receiving element 5 through a converging lens 4. If the distance between the projector 1 and the object 3 or the distance between the light receiving element 5 and the object 3 varies, then the angle of incidence of the reflected light on the light receiving element 5 or the position of the stop of reflected light on the surface of the light receiving element 5 varies. A computing unit 6 executes a predetermined computation based on the angle of incidence or the position of the spot of reflected light. A lens drive unit 7 drives a photographic lens 8 comprising a plurality of lenses (hereinafter called merely the photographic lens) to a proper focusing spot on the basis of the computation by the computing unit 6 so as to thereby complete the focusing.

Figure 2:
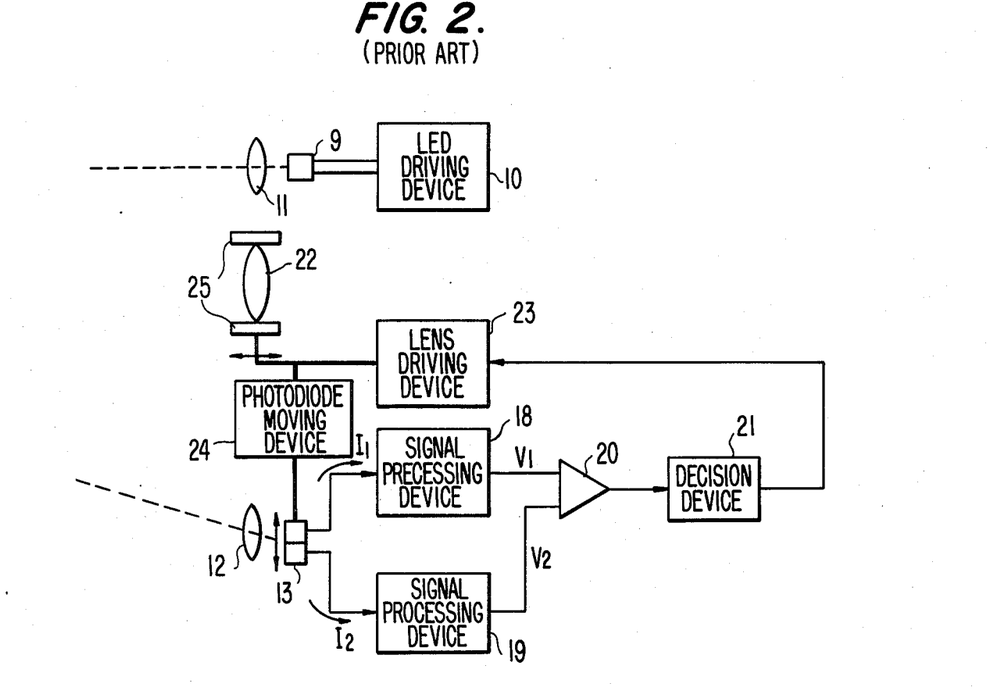
FIG. 2 is a block diagram of the principal portion of a conventional active-focusing device.
Figure 3A:
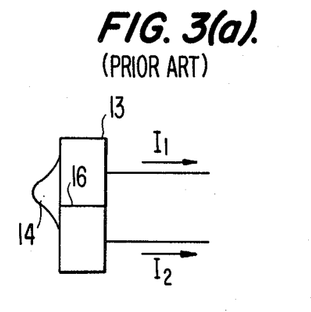

FIG. 2 is a schematic representation of a conventional example of an active system automatic focusing device using an infrared ray, in which an infrared light emitting diode 9 (hereinafter called the infrared LED) projects the distance measuring infrared ray modulated by a constant frequency or projected intermittently, by a LED driving device 10, thereby distinguishing the emitted infrared ray from an ambient noise infrared ray. The distance measuring infrared ray passes through a converging lens 11 and reflected by an object (not shown). The reflected light passes through a converging lens 12 to form a spot of light on a photodiode 13 divided in two (hereinafter called the two-divided PD). The two-divided PD 13 outputs signal currents $I_1$ and $I_2$ of intensities corresponding to the spot of light on the surface thereof. In other words, when the spot or light 14 shifts upwardly from the parting line 16 of the two-divided PD 13 as shown in FIG. 3-(a), the relationship of intensities between the signal currents $I_1$ and $I_2$ is given by the following inequality:

$$I_1 > I_2 \tag{1}$$

Figure 3B:
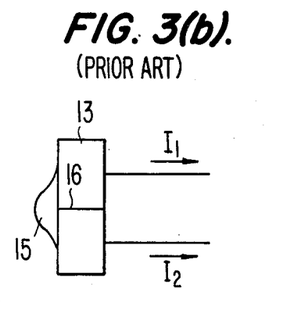

When the spot of light 15 is centered just on the parting line 16 of the two-divided PD as shown in FIG. 3-(b), the aforesaid relationship is given in the following equation:

$$I_1 = I_2 \tag{2}$$

Figure 3C:
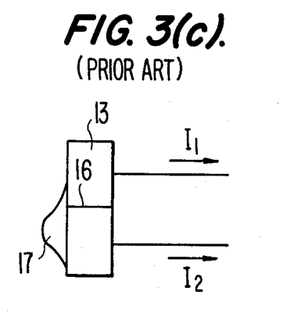

When the spot of light 17 shifts downwardly from the parting line 16 as shown in FIG. 3-(c), the relationship is given by the following inequality:

$$I_1 < I_2 \tag{3}.$$

Referring again to FIG. 2, the photocurrents $I_1$ and $I_2$ output from the two-divided PD 13 are converted by first and second signal processing devices 18 and 19 into voltages $V_1$ and $V_2$ proportional to the intensity of photocurrents $I_1$ and $I_2$ respectively. A comparator 20 compares the voltages $V_1$ and $V_2$ and a decision device 21 controls a lens driving device 23 to move a focusing mechanism 25 for a photographic lens 22 (schematically shown by a single convex lens) forwardly or rearwardly on the basis of the output of comparator 20. A photodiode moving device 24 moves the two-divided PD 13 in the directions of the arrows in FIG. 2 in association with the focusing mechanism 25, so that the focus adjusting mechanism 25 is stopped at the position where the photocurrents output from the two-divided PD 13 become equal to each other to thereby materialize the automatic focusing. In this conventional example, the mounting position and a mechanism movement of the two-divided PD 13 are pe-adjusted so that a shift of photographic lens 22 (of the focusing lens group) and that of two-divided PD are adapted to have a ratio of 1:1 therebetween.

Accordingly, the decision device 21 controls the moving direction of the photographic lens 22 so that the photocurrents $I_1$ and $I_2$ outputted from the two-divided PD 13 become equal to each other and stop the lens at the proper focusing spot, thereby realizing automatic focusing.

The conventional example is an effective focusing method having a characteristic as the active system focusing device, in which the distance measuring accuracy is hardly affected by the intensity of illumination of the object or by contrast, and the use of an infrared LED provides a sharp directivity. However, it is necessary for the video camera to photograph an object in continuous motion, whereby the aforesaid example must always continuously project the infrared ray while the photographic lens is moving toward the proper focusing spot. Hence, in a case where a moving range is large (for example, it takes several seconds to change the focus from that of an object at a short distance to that of an object at a long distance), a large current consumption is accompanied by the movement. Usually, for the use of the conventional example, a large current of 100 to 300 mA is always consumed during focusing the photographic lens, which is a serious problem from the viewpoint of portability for the video camera focusing device which is often powered by batteries. Also, it is necessary for the photodiode moving device to move in association with the focusing device like a helicoid of the lens, so that the photodiode mounting position largely restricts the design of mechanism for the photographic lens in the video camera.

SUMMARY OF THE INVENTION

As object of the invention is to provide an automatic focusing device for a video camera, which has a highly accurate distance measuring capability and a remarkable power saving function, thereby allowing a distance measuring projector to be installed without hindrance to the design of the photographic lens mechanism of the video camera.

The automatic focusing device of the invention, in order to attain the abovenoted object, comprises a projection means for projecting an infrared ray for measuring distances; a converging lens to focus a reflected light from an object whose distance is to be measured by the distance measuring infrared ray; a light spot detector, provided at the focusing spot of the converging lens, for outputting two photocurrents having a ratio which corresponds to an image-formation spot of the reflected light; a computation means for computing quantities corresponding to a sum of and a difference between the two photocurrents, a photographic lens for photographing the object; a lens encoder which detects a rotational angle of a helicoid of a focusing lens group used to focus the photographic lens and which converts the detected result into an electrical signal; a first comparator for comparing a difference between the two photocurrents with an output value of the lens encoder; a lens driving unit which moves the position of photographic lens forwardly or backwardly; and a second comparator which compares a sum of the two photocurrents with a predetermined value.

The above and other objects and novel features of the invention will more fully appear from the following detailed description taken in connection with the accompanying drawings.

BRIEF DESCRIPTION OF THE DRAWINGS

FIGS. 3-(a), -(b), and -(c) are views exemplary of the principle of operation of a two-divided photodiode used for the conventional example.

FIGS. 6-(a) and -(b) are graphs showing the time response of output values $V_{30}*(t)$ and $V_-*(t)$ of the computing means in proportion to a sum of and a difference between two photocurrent outputs in the FIG. 4 embodiment.

FIGS. 7-(a)-(e) are timing charts of light emission control of the infrared LED in the FIG. 4 embodiment.

DESCRIPTION OF THE PREFERRED EMBODIMENTS

Figure 4:
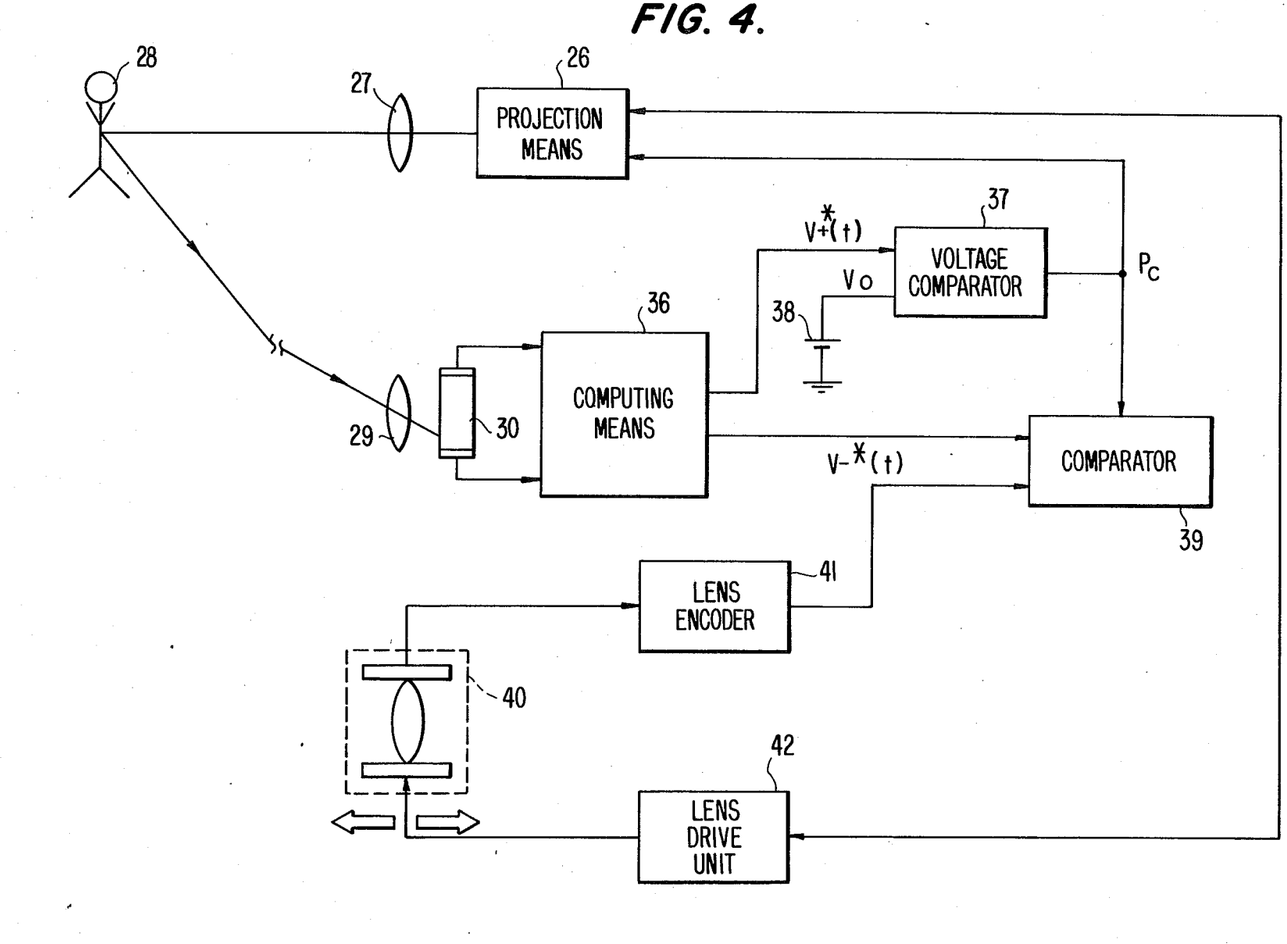
FIG. 4 is a block diagram of a first embodiment of the present invention.

Referring to FIG. 4, a light projection means 26 projects a distance measuring infrared ray intermittently at a predetermined frequency fc during a light emission period which is repeated at a constant cycle. The distance measuring infrared ray reaches an object 28 through a converging lens 27, and is reflected from the object to form a spot of light on the surface of a well-known light position detector 30, such as a PSD (Position Sensitive Device), by means of converging lens 29. The position of the spot of light on the surface of the light position detector 30 varies corresponding to a distance between the light position detector and the object.

Figure 5:
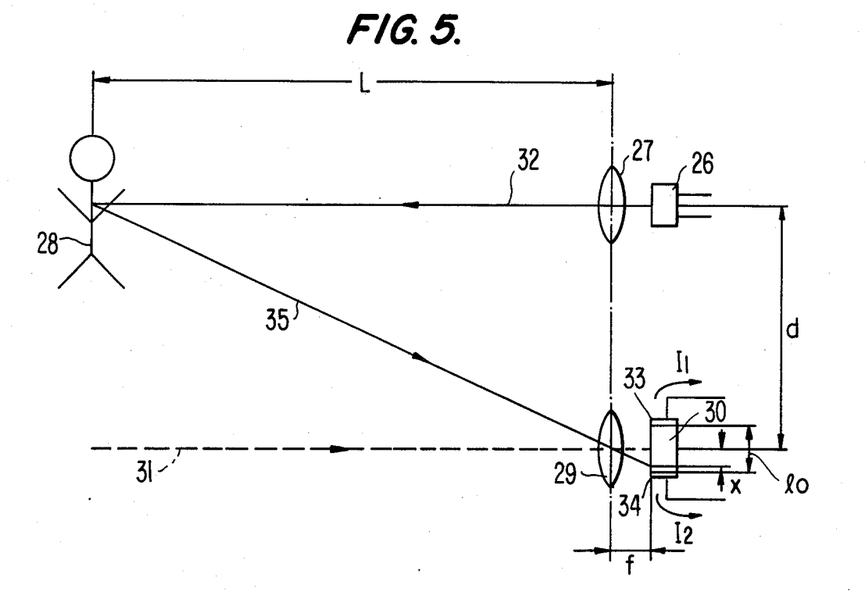
FIG. 5 is a schematic view showing the arrangement and distance measuring principle of an infrared LED and light position detected used in the first embodiment in FIG. 4.

An explanation is given below on the relationship between the spot of light and the object with reference to FIG. 5. In FIG. 5, the light projection means 26 and light position detector 30 of effective length lo are provided so as to be spaced at the centers from each other by an interval d, and a converging lens 29 is disposed ahead of the light position detector 30 at a distance about equal to a focal length f of the lens 29, thereby allowing the reflected light from the object 28 to focus on the surface of the light position detector 30. The light position detector 30 is disposed to receive the reflected light 31 at the center thereof (the light being considered to be parallel to the distance measuring infrared ray 32 projected from the light projection means 26), the light coming from an infinitely far distance. Output from the end electrodes 33 and 34 of the detector 30 are equal photocurrents $I_1$ and $I_2$. The reflected light 35 from the object 28 positioned apart from the converging lens 27 by a distance L shifts downwardly by a quantity x from the center of the light position detector 30 as shown in FIG. 5. Using simple geometrical considerations with respect to FIG. 5, the shift quantity x is given by the following equation:

$$x = (d \cdot f)/L \tag{4}$$

The two photocurrents $I_1$ and $I_2$ outputted from the light position detector 30 are inversely proportional to the distances between the output terminal electrodes 33 and 34 and the spot of light respectively, so that the photocurrents $I_1$ and $I_2$ are given by the following equations:

$$I_1 = \frac{\frac{lo}{2} - x}{lo} \cdot I_O \text{ and} \tag{5}$$

$$I_2 = \frac{\frac{lo}{2} + x}{lo} \cdot I_O, \tag{6}$$

where $I_O$ represents the total quantity of the currents. Equations (4), (5), and (6) are combined so as to obtain the following equation:

$$\frac{I_1 - I_2}{I_1 + I_2} = -\frac{2x}{lo} \tag{7}$$

$$= -\frac{2d \cdot f}{lo} \cdot \frac{1}{L} \tag{8}$$

Thus, it is seen from equation (8) that the quantity of (1/L) is proportional to the quantity $$\left( \frac{I_1 - I_2}{I_1 + I_2} \right).$$

The rotational angle of the helicoid of the usual photographic lens focusing mechanism is approximately proportional to the inverse of the distance from the object, so that, if the rotational angle of the helicoid of the photographic lens is detected, then automatic focusing will be possible.

Referring again to FIG. 4, an explanation is given below on the operation of the focusing device which is capable of measuring distance with a high accuracy and which can significantly reduce the current consumption of the distance measuring infrared LED, which is a significant object of the present invention.

The computing means 36 outputs values $V_+^*(t)$ and $V_-^*(t)$ proportional respectively to the sum of and difference between the two photocurrent outputs from the light position detector 30.

Figure 6A:
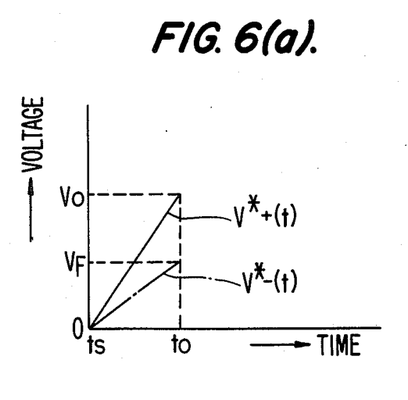
Figure 6B:
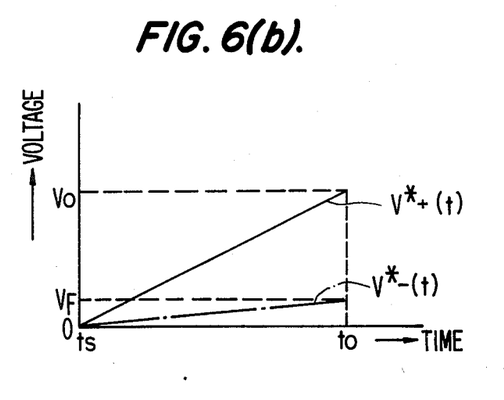

The explanation will be continued with reference to FIGS. 6-(a)-6-(b) as well as FIG. 5. FIG. 6-(a) shows waveforms for the object at a short distance, and FIG. 6-(b) shows waveforms for the object at a long distance. FIGS. 6-(a)-6-(b) showing output waveforms of the computing means 36. For simplifying the description, both $V_+^*(t_s)$ and $V_-^*(t_s)$ are assumed to be zero at the instant that the infrared LED 26 starts to project the distance measuring infrared ray at the time $t_s$, that is, $$V_+^*(t_s) = V_-^*(t_s) = 0 \qquad (9).$$

Also, $V_+^*(t)$ and $V_-^*(t)$ are assumed to increase with time. After the light projection means 26 starts light projection at the time $t_s$, the voltage comparator 37 compares the output $V_-^*(t)$ with a reference voltage value $V_o$ produced by a reference power source 38, and outputs a control pulse Pc at the time to when the output $V_+^*(t)$ coincides with the reference voltage value $V_o$. The control pulse Pc provides to the comparator 39 a time reference point for defining the following value $V_F$ corresponding to the difference between the two photocurrents at the time $t_o$:

$$V_F = V_-^*(t_o) \qquad (10).$$

Also, the control pulse Pc acts on the light-projection means 26 to force the distance measuring infrared ray to be stopped. The comparator 39 compares the value $V_F$ with the output of the lens encoder 41 which detects a quantity of movement or rotation (showing a deviation from the focused state) of the photographic lens 40, and operates the lens drive unit 42 to move the photographic lens 40 forwardly or backwardly until the value $V_F$ and the output of the lens encoder 41 correspond properly to each other.

The value of $V_F$ in the equation 10 is proportional to a normalized value obtained from the value of $\{V_-^*(t)/V_+^*(t)\}$ by assuming:

$$V_+^*(t) = V_o(t = t_o) \qquad (11).$$

Hereinafter, $V_F$ is called the normalized distance voltage.

Figure 7:
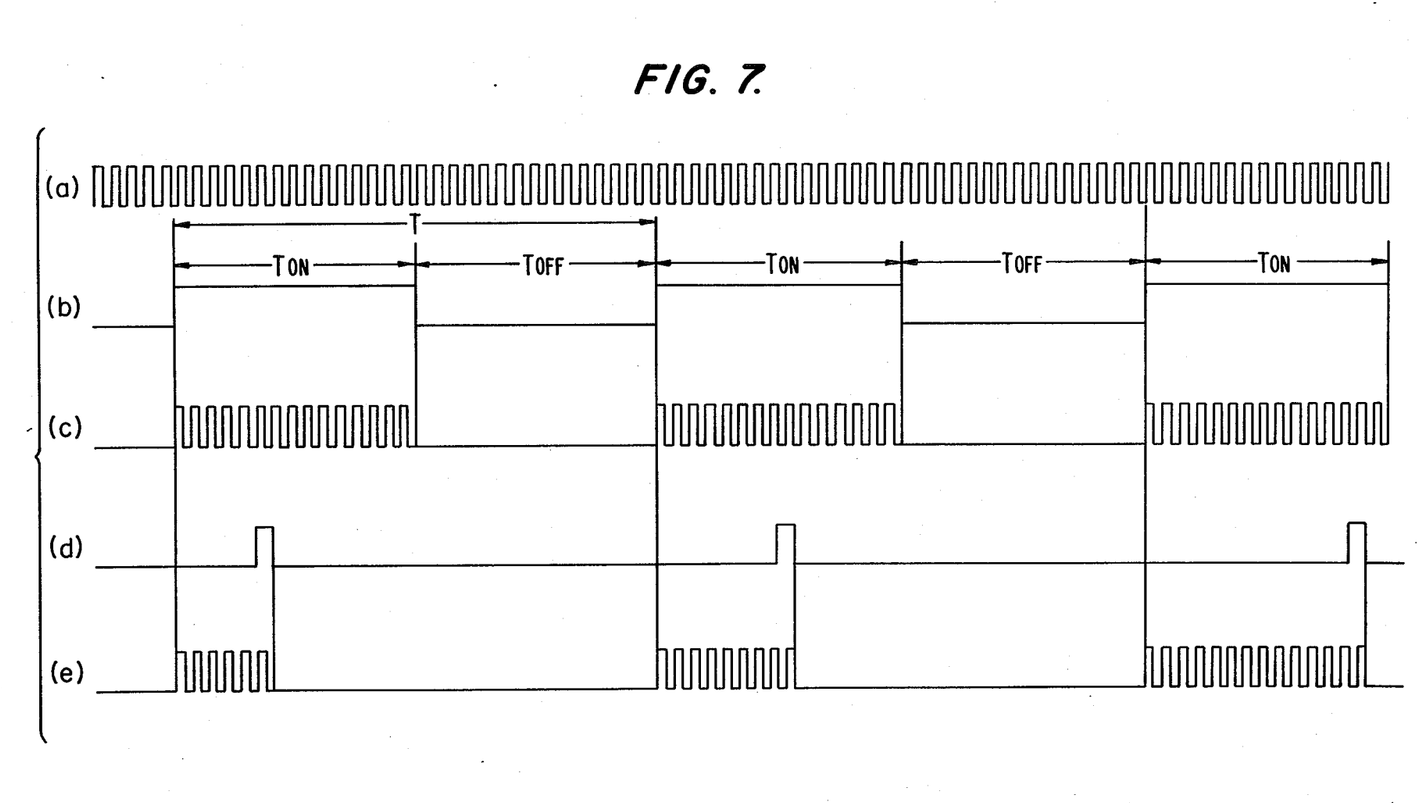

Hence, only by obtaining $V_+^*(t)$ at the time $t_o$ without dividing $V_-^*(t)$ by $V_+^*(t)$, a value proportional to $[\{I_1(t)-I_2(t)\}/\{I_1(t)+I_2(t)\}]$, in other words, the value proportional to the inverse of the distance, is obtained. Also, the driving time of the light projection means 26 is changeable according to the distance therefrom to the object so as to thereby enable a large reduction of the current consumption for driving the infrared LED. The reason for this is that, in this embodiment, the control pulse Pc controls the projecting time of the distance measuring infrared ray as shown in FIGS. 7(a)-7(e). The basic form of light emission in this embodiment is repetition of a light emission time period $T_{ON}$ and a non-emission time period $T_{OFF}$ at a predetermined cycle period T as shown in FIG. 7-(b). In the light emission time period $T_{ON}$, the distance measuring infrared ray is emitted intermittently at a constant frequency fc (shown in FIG. 7-(a)) as shown in FIG. 7-(c), where $$T_{ON} = T_{OFF} \qquad (12)$$

and $$fc \gg 1/T \qquad (13).$$

When the distance measuring infrared ray is projected in the light emission time period $T_{ON}$ and the control pulse Pc is outputted after a predetermined lapse of time as shown in FIG. 7-(d), the infrared LED driving device forcibly stops the light emission, so that the time of light emission is limited in accordance with the distance to be measured as shown in FIG. 7-(e). The amount of light of the distance measuring infrared ray reflected from the object and received by the light spot detector (to be hereinafter called the received amount of light) of course significantly changes corresponding to the distance L between the detector and the object. Thus, for an object at a short distance, the received amount of light is large (for example, when an infrared LED of sharp directivity is used, the received amount of light for L=1 m becomes about 100 times larger than that for L=10 m), and the control pulse Pc is generated soon after the emission of the distance measuring infrared ray. In brief, the reference voltage $V_o$ for generating the control pulse need only be set to a value by which the distance measurement operates at a sufficiently high accuracy in the farthest distance. In addition, in FIG. 6, the value of the normalized distance voltage $V_F$ with respect to an object at a short distance is larger than that of $V_F$ with respect to the object at a long distance because the value of $\{I_1(t)-I_2(t)\}$ with respect to the object at the short distance is larger than the value of $\{I_1(t)-I_2(t)\}$ with respect to the object at the long distance.

Second to sixth modified embodiments of the present invention are discussed below with regard to FIGS. 8, 9, 10, and 11.

Figure 8:
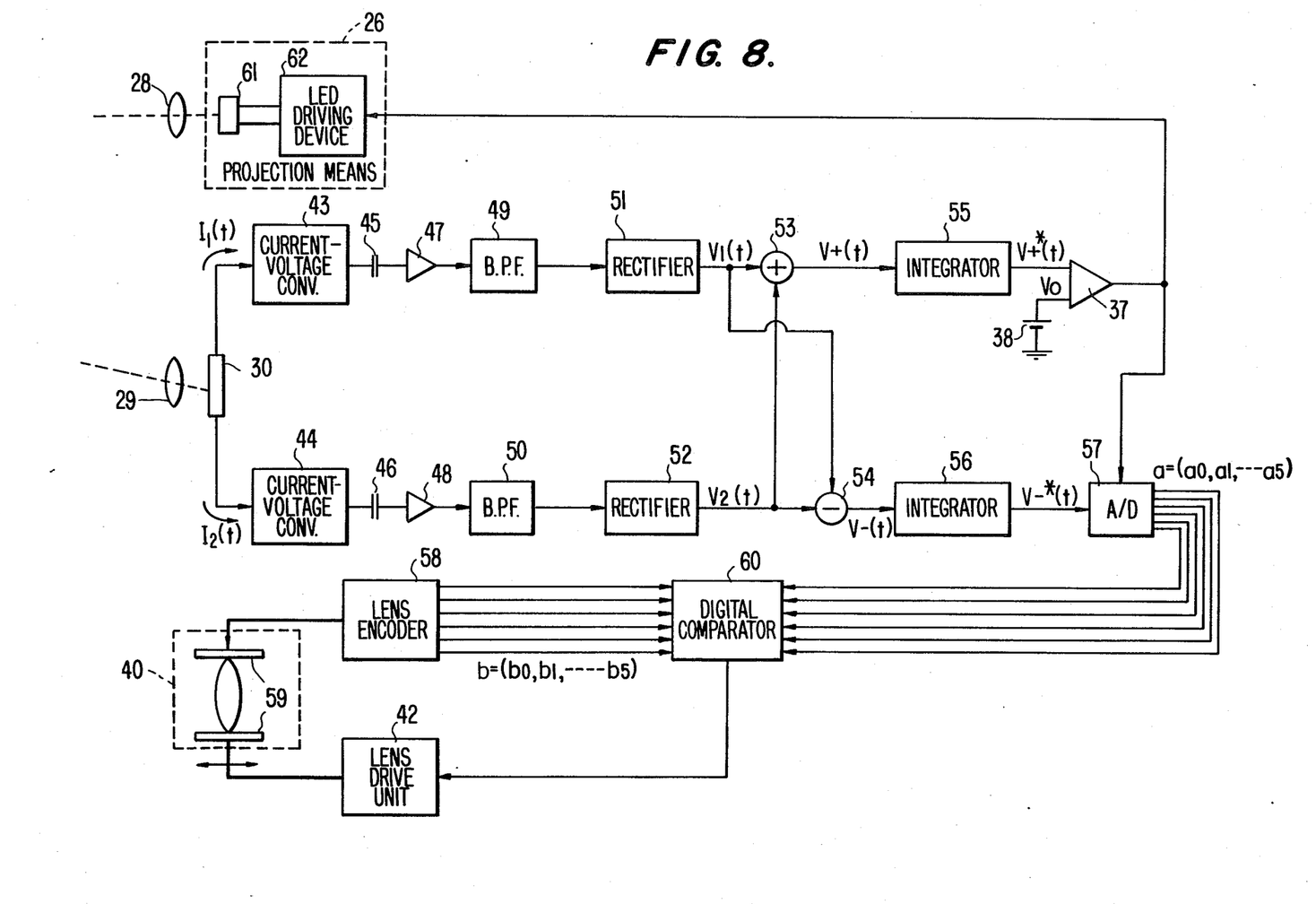
FIGS. 8 through 12 are block diagrams of second to sixth modified embodiments of the present invention.

In FIG. 8, two photocurrent outputs $I_1(t)$ and $I_2(t)$ from the light position detector 30 are converted to voltages by first and second current-voltage converters 43 and 44, and the converted voltages are fed to first and second amplifiers 47 and 48 through first and second capacitors 45 and 46. The DC noise components of the voltages are removed and the AC optical signal components are amplified by a predetermined multiplying factor by the amplifiers 47 and 48 respectively. The output voltages of the first and second amplifiers 47 and 48 are repeated rectangular or squarewave waveforms which are in synchronism with the driving frequency fc of the infrared LED, and first and second intermediate frequency bandpass filters 49 and 50 (hereinafter called B.P.F.s) are so constructed that the center frequencies thereof coincide with the driving frequency fc, thereby removing the noise components from the outputs of the first and second amplifiers 47 and 48 respectively. First and second rectifiers 51 and 52 output DC voltages $V_1(t)$ and $V_2(t)$ which are proportional to AC signal amplitude values of the outputs of the first and second B.P.F.s 49 and 50 respectively. An adder 53 adds DC voltages $V_1(t)$ and $V_2(t)$, outputted from the first and second rectifiers 51 and 52, so as to compute a value $V_+(t)$ which is proportional to the value of $\{V_1(t)+V_2(t)\}$; a subtractor 54 subtracts $V_2(t)$ and $V_1(t)$ so as to output a value $V_-(t)$ which is proportional to $\{V_1(t)-V_2(t)\}$. Thus, the following equations are obtained:

$$V_+(t) = \alpha \cdot \{V_1(t) + V_2(t)\} \quad (14)$$

and $$V_-(t) = \beta \cdot \{V_1(t) - V_2(t)\} \quad (15)$$

(where $\alpha$, $\beta$: constant).

A first integrator 55 carries out a voltage-current conversion corresponding to the DC voltage value outputted from the adder 53, and charges a capacitor (not shown) by a constant current, and outputs an integrated value $V_+^*(t)$ of its input waveform increasing approximately linearly with time. A second integrator 56 carries out a voltage-current conversion corresponding to the DC voltage value outputted from the subtractor 54, and carries out an integration computation so as to thereby output a value $V_-^*(t)$.

The above series of computation processes maintains the linearity of the signal, so that the output value $V_+^*(t)$ of the first integrator 55 is proportional to $\{I_1(t)+I_2(t)\}$ and the output value $V_-^*(t)$ of the second integrator 56 is proportional to $\{I_1(t)+I_2(t)\}$.

An adoptable voltage range, in other words, a changeable range of $V_F$ when the distance between the object and the photographic lens changes from the smallest distance to the infinitely far distance, is divided into 64 portions and outputted as a digital signal $a=(a_0, a_1, a_2 \ldots a_5)$ of 6 bits. The photographic lens 40 (schematically shown by one convex lens, but actually comprising a plurality of lenses) has its focal spot detected by a lens encoder 58. The detected focal spot is outputted as a position signal $b=(b_0, b_1, \ldots b_5)$ of 6 bits corresponding to each of the 64—divided portions of the range (e.g.—angle of the helicoid or the like) from the smallest distance to the infinitely far distance. The lens encoder 58 is mechanically connected to a focusing mechanism 59, such as a helicoid or the like, usually provided at a focusing lens unit of the photographic lens 40, and moves during focusing so as to output the position detection signal. A digital comparator 60 compares the bits of each corresponding digit in the digital signal a outputted from the analog to digital converter (A/D converter) 57 with corresponding bits in the digital signal b outputted from the lens encoder 58. A lens driving unit 42 receives the output of the digital comparator 60 so as to drive the focusing mechanism 59 of the photographic lens 40 in the proper direction for obtaining the condition: $a=b$, and stops the mechanism 59 at the optimum focusing spot, thus completing the automatic focusing.

In FIG. 8, reference numeral 26 shows a projecting means comprising an infrared LED 61 and a LED driving device 62, and reference numerals 37 and 38 show a voltage comparator and a reference voltage source respectively (the functions thereof have already been described before with reference to FIG. 4).

Figure 9:
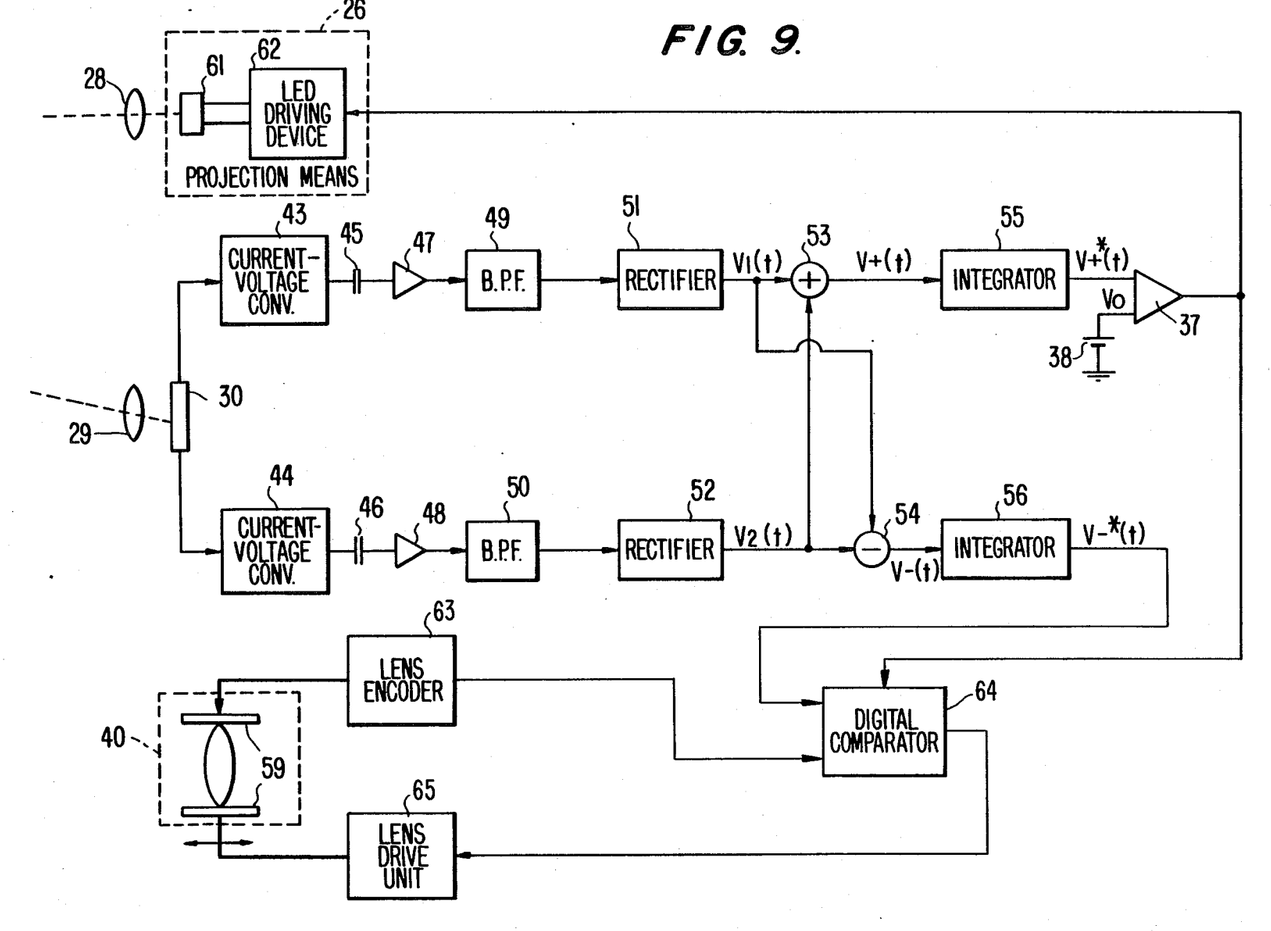

FIG. 9 is a block diagram of the third embodiment of the invention. Since the third embodiment includes many components in common with those in the second embodiment, the common components are designated by the same reference numerals as those used in FIG. 8. The third embodiment is different from the second one in that the comparator 64 compares an analog output value of the second integrator 56 directly with an analog position detection signal outputted from a lens encoder 63 (while in the second embodiment, the A/D converter 57 converts the analog output value $V_F$ into a digital signal so that the coincidence of output values is compared by the digital comparator 60 with a digital position detection signal outputted from the lens encoder 58). Hence, the lens encoder 63 is mechanically connected to the focusing mechanism 59, such as a helicoid, of the photographic lens 40, and outputs the position detection signal of an analog value which is changeable in association with the movement of the lens during focusing. Furthermore, a range of the output voltage values of the lens encoder 63 is adapted to coincide with a changeable range (that of $V_F$ when the distance between the object and the photographic lens changes from the smallest distance to infinity) adoptable by the normalized distance voltage $V_F$. The comparator 64 compares the normalized distance voltage $V_F$ at the instant of generating the control pulse Pc with the output value of lens encoder 63, and a lens drive unit 65 is operated so that both the voltage $V_F$ and the output value act on a lens driving unit 65 so as to coincide with each other, thereby moving the photographic lens 40 to the optimum focusing spot and stopping the lens 40 thereat, thus completing the automatic focusing. This embodiment needs not use an A/D converter to digitize the normalized distance voltage $V_F$, thereby simplifying the construction of the device.

Figure 10:
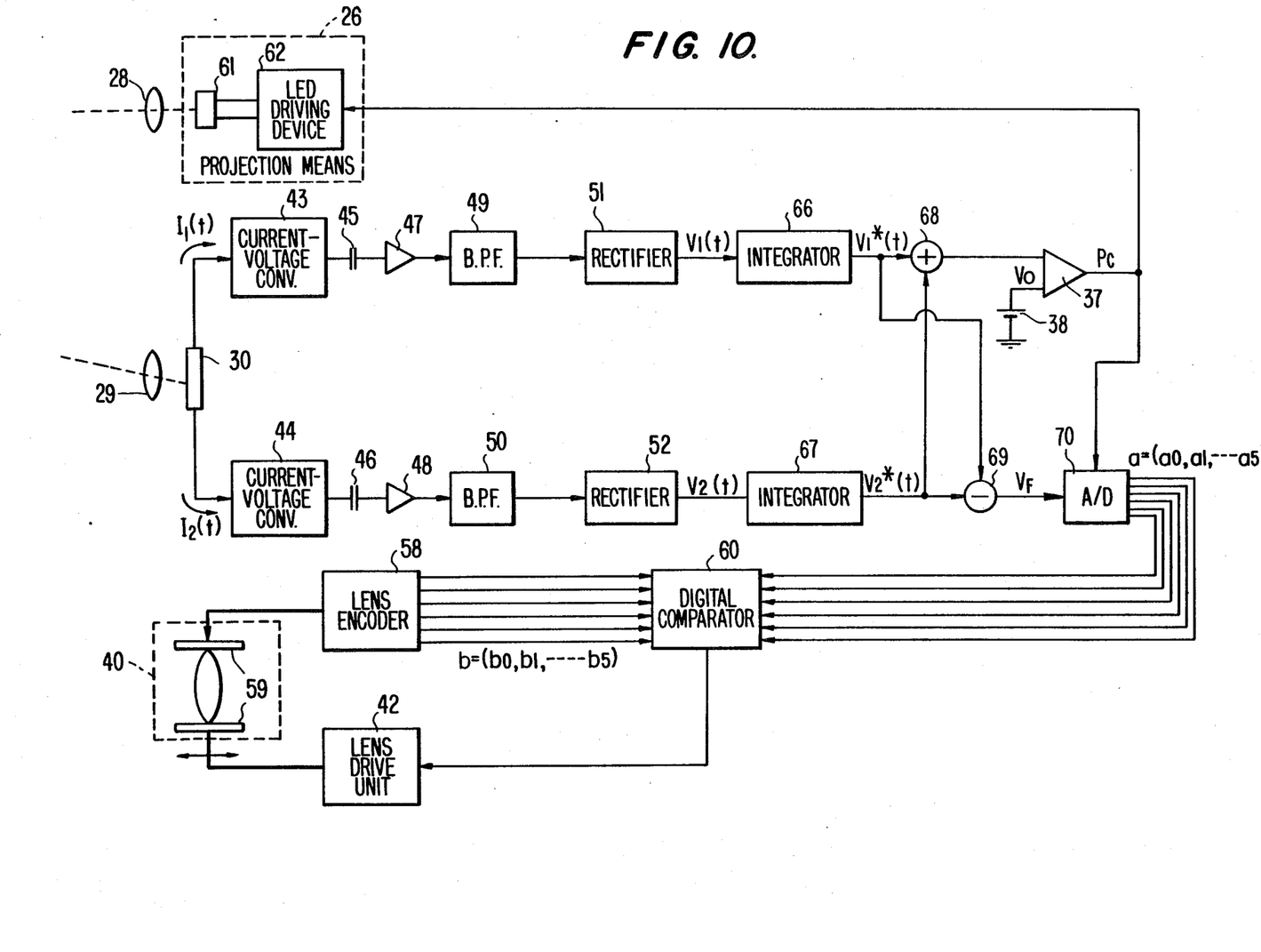

Next, the fourth embodiment is shown in FIG. 10, in which the two photocurrent outputs $I_1(t)$ and $I_2(t)$ of the light position detector 30 are converted to voltages by the first and second current-voltage converters 43 and 44. The voltages are passed through first and second capacitors 45 and 46, and have their DC noise components removed by the first and second amplifiers 47 and 48, and have only their AC signal light components amplified by a predetermined multiplying factor. The output voltages of the first and second amplifiers 47 and 48 are repeated rectangular or squarewave waveforms and are in synchronism with the driving frequency fc of the infrared LED driving device 62. First and second intermediate frequency bandpass filters 49 and 50 are so constructed that the central frequencies coincide with the driving frequency fc, thereby removing the noise component from the outputs of the first and second amplifier 47 and 48.

First and second rectifiers 51 and 52 output DC voltage $V_1(t)$ and $V_2(t)$ which are proportional to the AC signal amplitude values of the first and second B.P.Fs. 49 and 50 respectively. First and second integrators 66 and 67 carry out voltage-current conversion according to the DC output voltage values of the rectifiers to charge capacitors (not shown) by a constant current and output integrated values $V_1^*(t)$ and $V_2^*(t)$ having waveforms increasing linearly with time. An adder 68 adds the output values of the two integrators so as to obtain a value which is proportional to $\{V_1^*(t)+V_2^*(t)\}$ (hence, proportional to $\{I_1(t)+I_2(t)\}$) and subtractor 69 carries out subtraction between the output values $V_1^*(t)$ and $V_2^*(t)$ of the two integrators so as to obtain a value which is proportional to $\{V_1^*(t)-V_2^*(t)\}$ (hence, proportional to $\{I_1(t)-I_2(t)\}$).

The A/D converter 70 divides the voltage range (a changing range of $V_F$ when the distance between the object and the photographic lens 40 changes from a short distance to infinity) equally into 64 portions and outputs a digital signal $a=(a_0, a_1, \ldots a_5)$ of 6 bits. Also, the photographic lens 40 (schematically shown by one convex lens, but actually comprising a plurality of lenses) has its focusing spot detected by a lens encoder 58 and outputs a spot detection signal b=(b$_0$, b$_1$, ... b$_5$) of 6 bits obtained by dividing the range (e.g. —an angle of a helicoid or the like) from the object in the smallest distance to infinity equally into 64 portions. A digital comparator 60 compares the bits of the digital signal a outputted from the A/D converter 70 with the corresponding bits of the digital signal b outputted from the lens encoder 58.

Figure 11:
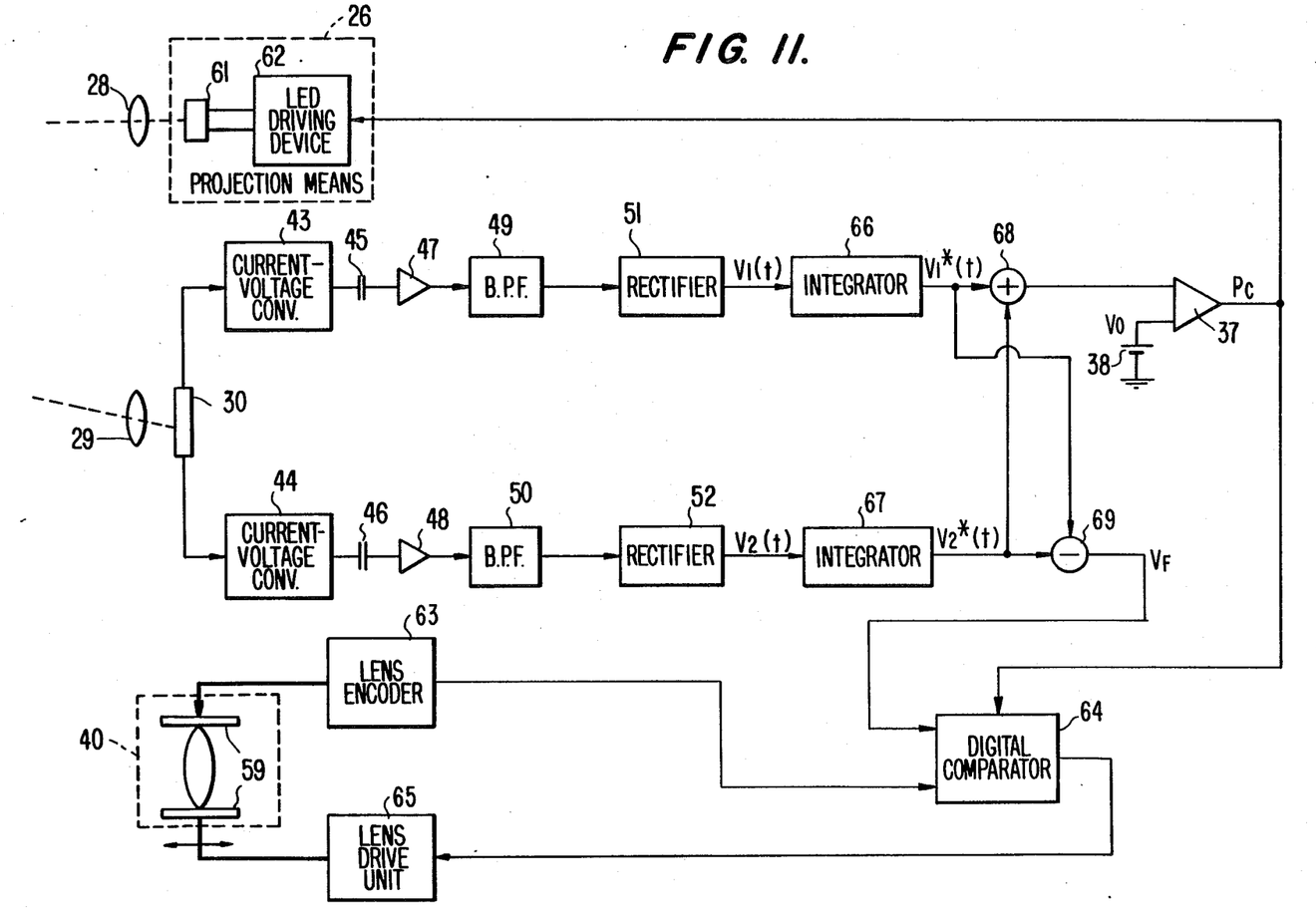

An explanation follows on the fifth embodiment shown in FIG. 11, in which the same components as those in the above-described three embodiments are designated by the same reference numerals as those in FIG. 10. The fifth embodiment is so constructed that an analog output value of a subtractor 69 is compared directly with an analog position detection signal outputted from a lens encoder 63 by means of a comparator 64. The lens encoder 63 is mechanically connected to a focusing mechanism 59, such as a helicoid, of the photographic lens 40, and outputs a position detection signal of an analog voltage value which is changeable in association with the movement of mechanism 59 during focusing. Also, the range of output voltage value of lens encoder 63 is adapted to coincide with the changeable range (that of $V_F$ when the distance between the object and the photographic lens 40 changes from the smallest distance to infinity). A comparator 64 compares the normalized distance voltage $V_F$ at the instant of generating the control pulse Pc with the output value of lens encoder 63 and acts on a lens drive unit 65 to make the distance voltage $V_F$ and output value of encoder coincide with each other, thereby moving the photographic lens 40 to the optimum focusing spot and stopping it thereat, thus completing the automatic focusing.

In addition, the aforesaid embodiments each have no mechanical moving portion at the distance measuring projection unit, thus, the light receiving unit need not be directly associated with the photographing lens, so that the projection unit and light receiving unit can be easily mounted in any location regardless of the location of the photographic lens, thereby being very effective in simplifying the design of a video camera photographic mechanism provided with the automatic focusing device.

Figure 12:
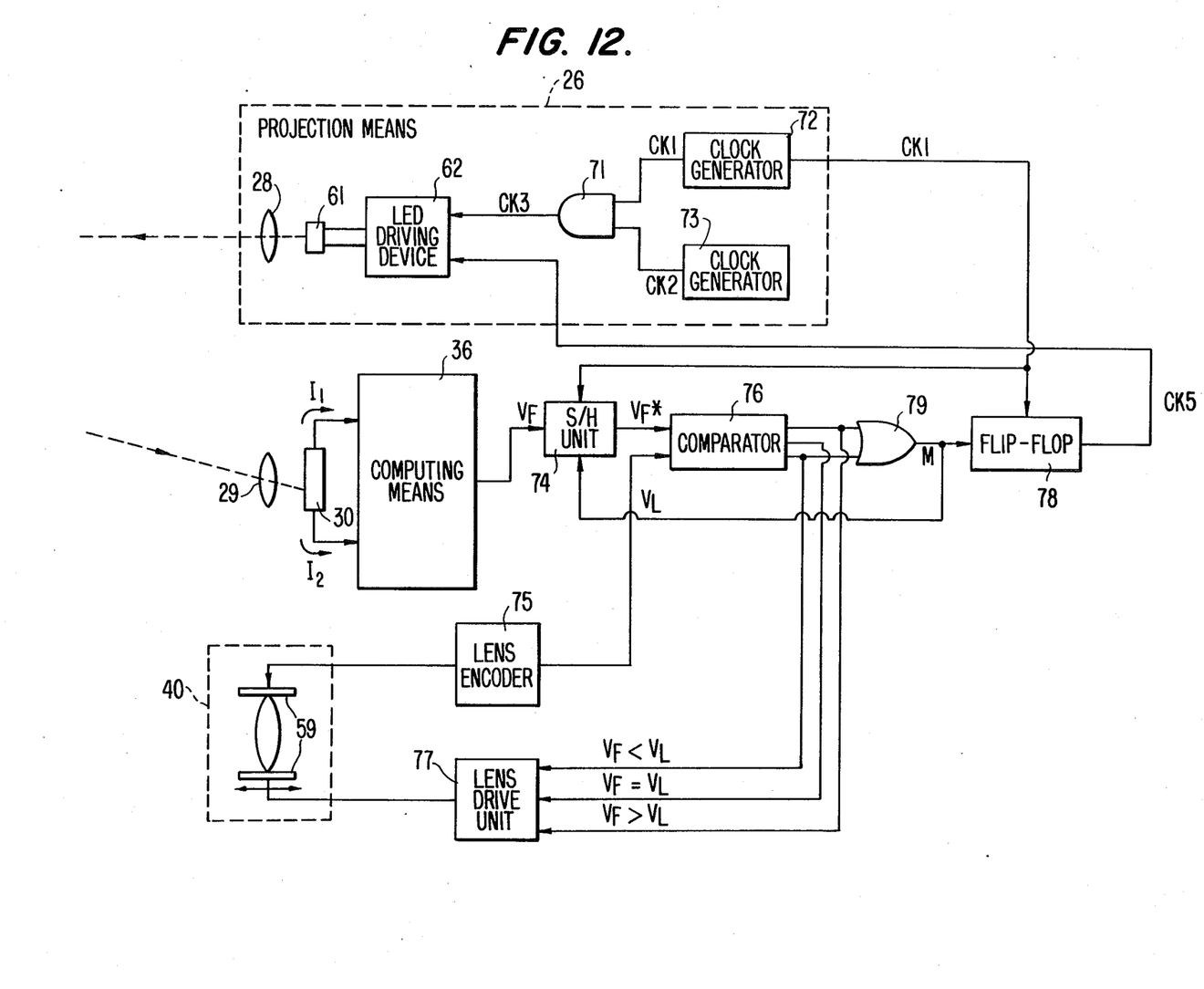

FIG. 12 is a block diagram of a lens drive unit which is constructed so as to significantly reduce current consumption of the distance measuring LED.

Usually, an infrared LED driving device 62 operates by receiving a logical product output CK$_3$ of an output CK$_1$ of a first clock generator 72 regulating the repeating cycle period T of the light emission time period T$_{ON}$ and the stop time period T$_{OFF}$ produced by an AND circuit 71 and an output CK$_2$ of a second clock generator 73 regulating the modulation frequency fc of the distance measuring infrared ray, wherein T, T$_{ON}$, T$_{OFF}$ and fc have the following relationships therebetween:

$$T = T_{ON} + T_{OFF}$$

$$T_{ON} = T_{OFF}$$

$$fc >> 1/T$$

Hence, the photocurrents I$_1$ and I$_2$ outputted from the light position detector 30 are of a modulated rectangular or sinewave waveform in synchronism with the modulation frequency fc, thereby being adapted to be distinguished from the ambient optical noise components. A computing means 36 computes from the photocurrents I$_1$ and I$_2$ a value $V_F$ which is proportional to $\{(I_1-I_2)/(I_1+I_2)\}$, and the value $V_F$ is given the following equation:

$$V_F = \alpha \cdot \frac{I_1 - I_2}{I_1 + I_2} \quad (\alpha: \text{constant}).$$

A sample/hold unit 74 outputs a value $V_R{}^*$ sample-holding the computing means output $V_F$ by a timing generated by itself (a pulse for regulating the timing is represented by CK$_4$) on the basis of a timing provided by the first clock generator 72. The focusing spot of the photographic lens 40 (schematically shown by one convex lens, but actually comprising a number of lenses), and in turn the amount of movement of the focusing mechanism 59 for moving a focusing lens group (not shown), is detected by a lens encoder 75 which is mechanically connected to the focusing mechanism 59 and is in association with the focusing movement thereof, and is regulated by a constant voltage value of the range from the smallest distance used for photographing to infinity so as to be outputted as a position detection signal $V_1$. A comparator 76 compares the sample-hold value $V_F{}^*$ with a position detection signal $V_L$ to output either one of three kinds of two non-coincident signals $V_F{}^* < L_L$ and $V_F{}^* > V_L$ and one coincident signal $V_F{}^* = V_L$. A lens drive unit 77 follows the output signal of comparator 76 to drive the focusing mechanism 59 as, for example, in the following manner:

When $V_F < V_L$, drives forward;

When $V_F = V_L$, stop; and

When $V_F > V_L$, drives backward.

A flip-flop circuit 78 outputs a light emission control signal CK$_5$ only at each pulse leading edge, thereby regulating the light emission time period outputted from a first clock generator 72. In other words, in a case where, at each time of starting the light emission, either one of the two kinds of non-coincident signals is outputted from the comparator 76 through an output M of an OR circuit 79 (that is, when the focusing mechanism 59 of the photographic lens is moving), the light emission control signal CK$_5$ acts on the infrared LED driving device, and neglects the outputs of the first and second clock generators 72 and 73, and forcibly stops the projection of the distance measuring infrared ray in the light emitting period. In brief, in this embodiment, the OR circuit 79 serves as the lens movement detector and the flip-flop circuit 78 as the light emission control device, at which time the timing across each signal is arranged by use of the representation in FIG. 13, in which reference M designates the existence of "drive" by the lens drive unit 77, and LD designates the actual "drive" of the infrared LED 61 (the state "1" corresponds to "drive" and the state "0" corresponds to a "stop"). Now, assuming that, at the time t=0, the photographic lens 40 focuses, the infrared LED 61 is subjected to the output of CK$_3$ and driven; at the time t=t, the computing element's output $V_F$ is sample-held, and the comparator 76 checks the focusing condition. Next, when the object moves to t$_4$<t<(T+t$_4$) and the distance thereto changes, the comparator 76 is subjected to CK$_4$ pulse outputted at t=(T+t$_4$) and generates the non-coincident signal at t=t$_5$ to thereby invert the condition of the OR circuit 79 also (M=1), at which time the lens driving unit 77 starts to move for refocusing the photographic lens 40. Since the movement is carried out during $t_5 < t < t_5'$, at the next rise time $t = 2(<t_5')$ of $CK_1$ pulse, $M = 1$ is obtained, and during the period of $2T < t < 5T/2$, $CK_5 = 1$ is obtained, so that the infrared LED 61 is not driven.

Figure 13:
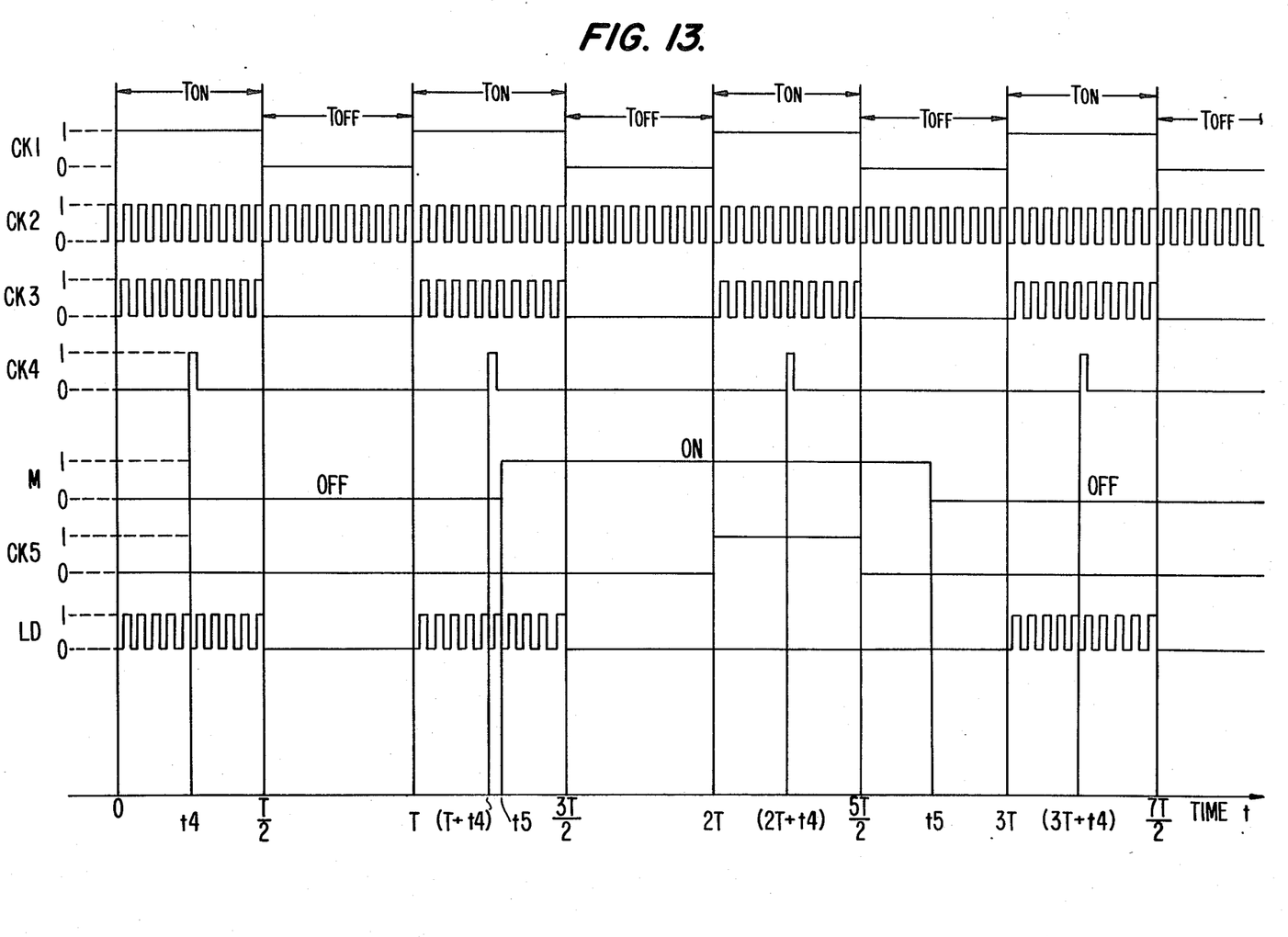
FIG. 13 is a timing chart of light emission control of the infrared LED in the sixth embodiment of the present invention.

Since the lens driving unit 77 completes the focusing and stops of the $CK_1$ pulse rise time $t = 3T$, $M = 0$ again is developed to allow the infrared LED 61 to emit the light and the focusing once more is confirmed. In addition, the data rest at the sample hold unit 74 is carried out usually at the timing of $CK_1 = 0$, but only in the time period of not driving the infrared LED 61 (the period of $M = 1$), the reset is not carried out even when $CK_1 = 0$, so that the former output results of the computing means are adapted to be fed directly into the comparator.

Although several embodiments have been described, they are merely exemplary of the invention and not for limiting the scope of the invention, the invention being defined solely by the appended claims.

What is claimed is:

1. An automatic focusing device for a video camera, comprising:
   a projection means for projecting a distance measuring ray;
   a converging lens for converging the distance measuring ray which has been reflected from an object to be measured;
   a light spot detector positioned at a focus of said converging lens and outputting two photocurrents, a ratio of the two photocurrents varying corresponding to a spot of light formed on said light spot detector by the reflected distance measuring ray;
   a computing means for computing a sum of and a difference between said two photocurrents;
   a photographic lens for photographing said object;
   a focusing lens for focusing said photographic lens;
   a lens encoder which detects movement of said focusing lens and converts the detected movement into an electrical signal;
   a first comparator for comparing the difference between said two photocurrents with an output value of said lens encoder;
   a lens driving means for driving said focusing lens forwardly or backwardly; and a second comparator for comparing the sum of said two photocurrents with a predetermined value;
   wherein said projection means stops projection when the sum of said two photocurrents coincides with said predetermined value, and
   said lens driving means drives said focusing lens until the output value of said lens encoder reaches a value corresponding to the difference between said two photocurrents at the time when said projection means stops projection, thereby stopping said lens in an optimum focused position.

2. An automatic focusing device for a video camera as set forth in claim 1, wherein said computing means comprises: first and second integrators which integrate said two photocurrents individually and output voltage values linearly increasing and decreasing respectively; an adder for adding output values of said first and second integrators, and a subtractor for subtracting the output values of said first and second integrators.

3. An automatic focusing device for a video camera as set forth in claim 1, wherein said computing means comprises: two current-voltage converters for converting said two photocurrents into two corresponding voltages; an adder for adding the two voltages of said two current-voltage converters; a first integrator for charging a capacitor with a constant current corresponding to an amplitude value of an output of said adder; a subtractor for subtracting the two voltages of said two current-voltages converters, and a second integrator which charges a capacitor with a constant current corresponding to an amplitude value of an output of said subtractor.

4. An automatic focusing device for a video camera as set forth in claim 1, wherein said lens encoder divides a rotational range of said focusing lens corresponding to a distance from a smallest distance from said object to said photographic lens to infinity into a predetermined number of divisions and outputs a digital signal corresponding to each of the predetermined number of divisions, and wherein said first comparator comprises an analog-digital converter for dividing a signal range of the difference between said two photocurrents into the same number of divisions as that of said lens encoder, and a digital comparator for digitally comparing the output value of said analog-digital converter with the output value of said lens encoder.

5. An automatic focusing device for a video camera as set forth in claim 1, wherein said lens encoder outputs an analog voltage signal which changes linearly in response to the rotation of said focusing lens corresponding to a distance from a smallest distance from said object to said photographic lens to infinity, a signal range of the difference between said two photocurrents being set to be equal to a signal range obtainable by said lens encoder, said first comparator being adapted to analogically compare the difference between said two photocurrents with the output value of said lens encoder.

6. An automatic focusing device for a video camera as set forth in claim 1, wherein said projection means comprises: a lens movement detector which detects by an output of said comparator whether or not said focusing lens is moving, a clock generator which regulates a repeating cycle of projection and stopping of said distance measuring ray and a modulation frequency of said distance measuring ray, and a light-emission control device which drives said projection means on the basis of an output of said clock generator and inspects an output of said lens movement detector at the starting time of each projection of said distance measuring ray so that, when said focusing lens is moving, said output of said clock generator is ignored and said projection of said distance measuring ray is forced to stop.

* * * * *